United States Patent Office 2,913,469
Patented Nov. 17, 1959

2,913,469
ORGANOTITANIUM COMPOUNDS AND PROCESS OF PREPARATION

Charles A. Russell, Fair Haven, N.J., assignor to National Lead Company, New York, N.Y., a corporation of New Jersey No Drawing. Application August 7, 1956
Serial No. 602,504

10 Claims. (Cl. 260—429.5)

This invention relates in general to organotitanium compounds. More specifically it relates to diol titanates.

In recent years various types of organotitanium compounds have been produced and many new uses have been discovered for these various compounds. Among the organotitanium compounds which have been produced are diol titanates. Such compounds may be either complex monomers or polymers and they are frequently chelated. They are useful as adhesives, as surface active agents, as additives for various coating and sealing compositions and the like.

According to the instant invention however, a new class of organotitanium compounds has been discovered which compounds are not only more effective than the corresponding diol titanates themselves but they also possess properties which make them useful for a number of different purposes for which diol titanates cannot be used.

An object of the instant invention is the preparation of a new class of useful organotitanium compounds. Another object is to provide a method for producing a new class of organotitanium compounds. A still further object is to provide organotitanium compounds which can be used for purposes hitherto unknown.

Another object is to provide a process for maintaining free and semi-colloidal carbonaceous material in a dispersed state in a fuel. These and other objects will become more apparent according to the following more detailed description of the instant invention.

Broadly, this invention contemplates diol acyl esters of titanic acid comprising quadrivalent titanium covalently bonded with 4 moles of organic groupings selected from the group consisting of diol, acyl and alkyl. The diol grouping in said compound is either straight or branched chained, either saturated or unsaturated. The positions of the two hydroxyl groupings in said diol are either on adjacent carbon atoms or on carbon atoms separated by 1, 2 or 3 carbon atoms. The acyl grouping is derived from a monocarboxylic acid and has from 2 to 20 carbon atoms. The acyl grouping is either a saturated or unsaturated aliphatic grouping. The alkyl grouping is an aliphatic hydrocarbon containing from 2 to 18 carbon atoms. The diol acyl ester of orthotitanic acid contains at least 1 and not more than 3 diol groupings and at least 1 and not more than 3 acyl groupings. The alkyl grouping is present when the sum of the diol and acyl groupings is less than 4. The maximum amount of alkyl groupings therefore can be no greater than 2 since at least 1 diol grouping and at least 1 acyl grouping must be present in the compound.

When more than 1 diol or acyl grouping is employed it is obvious that different diols or acyl groupings may be employed.

This invention further contemplates a process for preparing such organotitanium compounds which comprises reacting an acyl titanate with a diol to produce diol acyl esters of titanic acid.

In fact it has been discovered that, by reacting an acyl titanate with diols which normally form insoluble polymeric gels with alkyl titanates, low molecular weight soluble products are obtained.

The acyl titanate employed in the process of the instant invention may be prepared by the reaction of an alkyl titanate and an organic acid.

The acyl grouping of the titanate employed should be derived from an acid containing only one carboxyl group and have from 2 to 20 carbon atoms. The acyl grouping of the titanate may be either a saturated or an unsaturated aliphatic grouping. If an alkyl grouping is present in the diol acyl ester of titanic acid, the alkyl grouping should be an aliphatic hydrocarbon containing from 2 to 18 carbon atoms. As previously stated the diols employed may be either saturated or unsaturated, either straight chain or branch chain compounds and the two hydroxyl groupings in said diol should be either adjacent to one another or separated by 1, 2 or 3 carbon atoms. The use of diols of these types produces diol acyl esters of titanic acid which are the most satisfactory for a wide variety of uses.

With respect to the linkage between the diol and the titanium, the titanium values are either covalently or coordinately bonded to the oxygen of the diol grouping. In some cases both the hydroxyl groups of the diol grouping may react to form covalent bonds which produce structures of the following type:

(A) 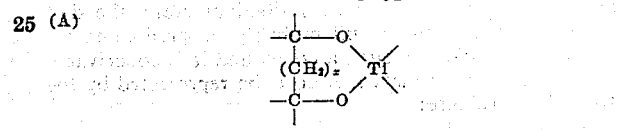

There is, however, a greater tendency for only one of the hydroxyl groups to react to form a covalent titanium-oxygen bond, the other hydroxyl group becoming coordinately linked to the titanium atom to form the following type structure:

(B) 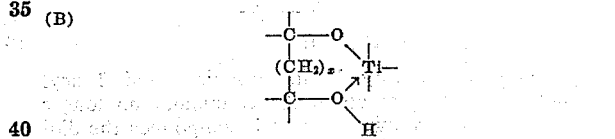

Furthermore, under certain conditions when the mole ratios between the titanium and the acyl and diol groupings are present in amount so that the total hydroxyl and acyloxy groupings are more than 6 per titanium atom, then only one hydroxyl group of the diol grouping will be bonded to the titanium, the other hydroxyl group of the diol remaining free as shown for example in the following structure:

(C) 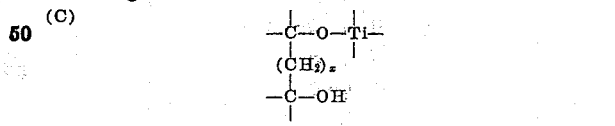

In all of the type structures presented above and in those presented below the $x$ is 0, 1, 2 or 3. Although in all of these structures shown only unbranched chains between the two hydroxyl groups are illustrated, branched chains having one or more lower alkyl groups substituted for the hydrogens on any or all of the carbon atoms may be used to link the two hydroxyl groups of the diol grouping. Furthermore, it has been found that the hydroxyl groups of the diol grouping may be primary, secondary or tertiary.

Unsaturated diols of the type

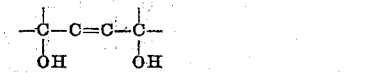

or

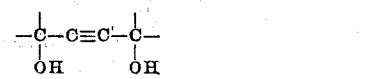

may also be employed in addition to the diols having unsaturation occurring in the side chains.

As previously stated, the diol acyl titanate composition of the instant invention may have from 1 to 3 diol groupings and 1 to 3 acyl groupings. The sum of the diol, acyl and alkyl groupings present in said compound being 4. In compounds having 1 diol grouping, 1 acyl grouping and 2 alkyl groupings per titanium atom, the linkage between the diol and the titanium conceivably may be any one or a combination of the types illustrated above as (A), (B), and (C). However, it is believed more likely that type (B) will predominate. In such a compound it is conceivable that the compound may, therefore, be represented by the following structure:

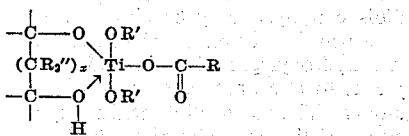

where R in the acyl group is either a saturated or unsaturated straight or branched chained aliphatic grouping containing from 1 to 19 carbon atoms. R' is an aliphatic hydrocarbon containing from 2 to 18 carbon atoms and R'' is either hydrogen or a lower alkyl grouping.

In compounds having 2 diol groupings, 1 acyl grouping and 1 alkyl grouping for each titanium atom, the diol linkage to the titanium will probably be predominantly that of type (B). In such a compound it is conceivable that the compound may, therefore, be represented by the following structure:

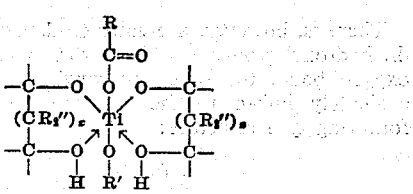

In compounds having 2 diol groupings and 2 acyl groupings per titanium atom, the compound no longer requires an alkyl grouping. In such compounds the diol linkage to the titanium will probably also be predominantly that of type (B). The compound formed probably may be represented by the following structure:

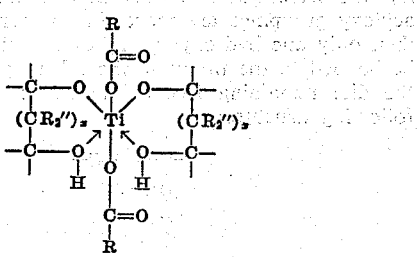

R'' in the chain is either hydrogen or a lower alkyl grouping.

When the compound has 3 diol groupings, and one acyl grouping per titanium atom, the diol linkage to the titanium would probably predominantly be that of both types (B) and (C). Such compounds can possibly be represented by the following structure:

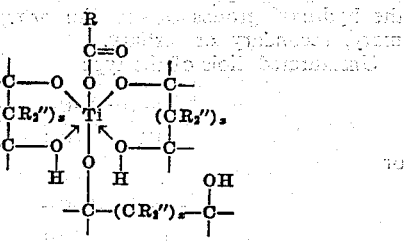

Although the groupings have been expressed as whole number ratios in these structures for purposes of illustration and simplification, intermediate values of ratios may be used resulting in mixtures of products having structures similar to those illustrated above.

In order to more clearly illustrate the instant invention, the following examples are presented.

EXAMPLE 1

A butanol solution of tributyl stearoyl titanate was prepared by adding 28.4 parts of stearic acid to 34 parts of tetrabutyl titanate.

Di(2-methylpentanediol-2,4)butyl stearoyl titanate was then prepared by adding 23.6 parts of 2-methylpentanediol-2,4 to 62.5 parts of a butanol solution of tributyl stearoyl titanate. The mixture grew warm and a clear solution resulted. Evaporation of the butanol left a waxy solid which was readily soluble in benzene, mineral spirits and kerosene. These solutions dispersed pigments better than the solvent alone.

EXAMPLE 2

14.2 parts of stearic acid were added to 28.2 parts of tetra-2-ethylhexyl titanate. The mixture was warmed slightly and a clear solution of the tri-2-ethylhexyl stearoyl titanate was formed. To this was added with stirring 11.8 parts of 2-methylpentanediol-2,4. A clear solution of the di(2-methylpentanediol-2,4)2-ethylhexyl stearoyl titanate resulted. When diluted with benzene and cast on a glass plate, a clear hydrophobic film remained after allowing to stand 24 hours in a moist atmosphere. The film was readily soluble in hydrocarbons.

EXAMPLE 3

14.2 parts of stearic acid were added to 17 parts of tetrabutyl titanate. After solution was complete, 17.7 parts of 2-methylpentanediol-2,4 were added. A clear, bright yellow solution resulted which was readily soluble in hydrocarbons. A 1% solution of the tri-(2-methylpentanediol-2,4) stearoyl titanate in kerosene was an excellent dispersant for carbon black.

EXAMPLE 4

Di-(butanediol-1,4) butyl oleoyl titanate was prepared by adding 9.0 parts of butanediol-1,4 to 31.0 parts of a solution of tributyl oleolyl titanate, prepared by adding 14.1 parts of oleic acid to 17 parts of tetrabutyl titanate. On mixing, heat was evolved and a clear yellow solution resulted. The product when dissolved in mineral spirits was not precipitated on shaking with water and allowing to stand.

EXAMPLE 5

The procedure in Example 1 was repeated except that 15.2 parts of propylene glycol were added to the 62.5 parts of tributyl stearoyl titanate solution in place of the 2-methylpentanediol-2,4. Instead of forming a gel, as normally results when propylene glycol is added to tetrabutyl titanate, a clear yellow solution resulted. After standing over night a white crystalline solid precipitated. The solid di-(propylene glycol) butyl stearoyl titanate was redissolved in the mother liquor on heating to 100° C., and was readily soluble in hydrocarbon solvents.

EXAMPLE 6

Di-(3,6-dimethyl-4-octynediol-3,6) butyl stearoyl titanate was prepared by the same procedure as in Example 1 using 34 parts of 3,6-dimethyl-4-octynediol-3,6 in place of the 2-methylpentanediol-2,4. The results were comparable to Example 1.

EXAMPLE 7

6 parts of glacial acetic acid were added to 34 parts tetrabutyl titanate with cooling. 29.2 parts of 2-ethylhexanediol-1,3 were added to the solution. A clear pale yellow solution of the di-(2-ethylhexanediol-1,3) acetyl titanate resulted.

EXAMPLE 8

14.6 parts of 2,2,4-trimethylpentanediol-1,3 were added to 28.4 parts of a solution of tributyl myristoyl titanate prepared by adding 17 parts of tetrabutyl titanate to 11.4 parts of myristic acid. A clear pale yellow solution of the di-(2,2,4-trimethylpentanediol-2,4) myristoyl titanate resulted. The product was readily soluble in nonreactive organic solvents. A 0.1% solution of this product in kenosene dispersed carbon black better than a 0.1% solution of di-(2,2,4-trimethylpentanediol-1,3) titanate in kerosene.

EXAMPLE 9

2-methylpentanediol-2,4 butyl distearoyl titanate was prepared by mixing 5.9 parts of 2-methylpentanediol-2,4 with 45.4 parts of a solution of dibutyl distearoyl titanate, prepared by adding 28.4 parts of stearic acid to 17 parts of tetrabutyl titanate. A clear pale yellow solution was formed. The solid product was recovered by evaporation of the butanol. The product was readily soluble in non-rective organic solvents.

EXAMPLE 10

Di-(2-methylpentanediol-2,4) distearoyl titanate was prepared by the same procedure as in Example 9 except that 11.8 parts of 2-methylpentanediol-2,4 were added instead of 5.9 parts. The results were essentially the same as in Example 12. When a 5% solution of the product in mineral spirits was brushed on a ceramic body and the solvents allowed to evaporate, the surface of the ceramic body showed a high degree of water repellancy.

EXAMPLE 11

Di-(2,5-dimethylhexanediol-2,5) stearoyl titanate was prepared by mixing 27.5 parts of tributoxy stearoyl titanate and 14.6 parts of 2,5-dimethylhenanediol-2,5 and warming until a clear yellow solution was produced. On cooling the product separated as a white crystalline solid.

EXAMPLE 12

Di-(2,5-dimethyl-3-hexynediol-2,5) stearoyl titanate was prepared by following the procedure in Example 11, except that 14.2 parts of 2-5-dimethyl-3-hexanediol-2,5 were used in place of the 2,5-dimethylhexanediol-2,5. The results were the same except that the product was darker.

From the above description and by the examples shown a new class of useful organotitanium compounds have been produced. The diol acyl titanates produced by the instant invention in general are superior to the corresponding diol titanates which have previously been produced. These diol acyl titanates are useful as surface active agents, waterproofing agents and dispersing agents for carbonaceous material in hydrocarbons and other organic solvents. Such compounds are also compatible with water present in any organic media and are not readily susceptible to hydrolysis to yield insoluble products.

In addition to the compounds and their method of preparation described above, this invention also contemplates a process for maintaining free and semi-colloidal carbonaceous material in suspension in a liquid hydrocarbon fuel by admixing and dissolving in said fuel from 0.001% to 2.0% by weight of a diol acyl ester of titanic acid comprising quadrivalent titanium co-valently bonded with 4 moles of organic groupings selected from the group consisting of diols, acyl and alkyl, said diol grouping selected from the group consisting of straight chained and branched chained groupings, said diol grouping selected from the group consisting of saturated and unsaturated groupings, the position of the two hydroxyl groups in said diol grouping being selected from the group consisting of hydroxyl groups attached to adjacent carbon atoms and carbon atoms separated from one another by 1, 2 and 3 carbon atoms, said acyl grouping derived from a monocarboxylic acid and having from 2 to 20 carbon atoms, said acyl grouping selected from the group consisting of saturated and unsaturated aliphaphatic groupings, said alkyl grouping being an aliphatic hydrocarbon containing from 2 to 18 carbon atoms, said diol acyl ester of titanic acid containing from 1 to 3 groupings and from 1 to 3 acyl groupings.

Although many products are produced from crude oil in large quantities, the instant invention is concerned only with fuels which are directly fired as liquids. The instant invention is not concerned with fuels used in internal combustion engines in which the fuel is vaporized prior to injection into the cylinder. The liquid hydrocarbon fuels of the instant invention therefore include kerosene, distillate fuel oil, residual ful oil and jet and diesel fuels.

All of these petroleum products contain various amounts of impurities which cause residues to build up in the combustion chamber fuel lines and filters and such residues often result in serious problems in commercial installations. These residues are usually caused by the presence of free or semi-colloidal carbon or coke which gradually settles and builds up in various parts of the system. Many attempts have been made to overcome this residue formation and various titanium compounds have been tried for this purpose. Among these include alkyl titanates, triethanolamine titanate and the like but none of these have been successful. Acyl titanates have also been tried and found to be unsuccessful since the moisture present in the fuel reacts with the acyl titanate to form insoluble condensed titanate polymers upon standing.

It is, therefore, desirable to employ a titanium compound which does not form insoluble polymers with the moisture in the fuel oil. It has been found that the compositions of the instant invention overcome this objection.

The preparation of the diol acyl esters of titanic acid have been described in detail above and any of these compounds are useful as agents for maintaining in suspension free and colloidal carbonaceous material in liquid hydrocarbon fuels.

In order to maintain in suspension such carbonaceous material in fuel the diol acyl ester of titanic acid are admixed with and dissolved in the liquid hydrocarbon fuel in any ordinary way and preferably at room temperature.

The amount of the diol acyl ester of titanic acid employed in the composition may vary over a wide range, however, for efficient and effective dispersion of the carbonaceous matter in the fuel, it is desirable to employ from about .001% to about 2.0% by weight of the organic treating agent in the liquid hydrocarbon fuel.

In order to illustrated more fully the process of the instant invention, the following examples are presented:

EXAMPLE 13

Samples of kerosene containing 2,5-dimethylhexanediol-2,5 stearoyl dibutyl titanate were prepared by adding (a) 0.001 g., (b) 0.01 g., (c) 0.25 g., (d) 0.05 g., (e) 0.1 g., and (f) 0.5 g., of the titanate per 100 ml. of kerosene. The 2,5-dimethylhexanediol-2,5 stearoyl dibutyl titanate was prepared by adding one mole of stearic acid to one mole of tetrabutyl titanate. After the solution became clear, one mole of 2,5-dimethylhexanediol-2,5 was added to form a clear solution of the diol acyl titanate.

Ten ml. of each of the kerosene solutions were placed in test tubes and a few drops of water were added to each one. After shaking, the samples were allowed to stand. After two months, no sediment due to hydrolysis was noticeable.

EXAMPLE 14

The procedure of Example 13 was repeated except that 0.1 g. of carbon black was added to 20 ml. of each of the solutions in a test tube in place of the water. These were stoppered and shaken and then allowed to stand. A sample of kerosene only was included as a control. The samples were checked for the amount of carbon remaining dispersed periodically and graded as follows: 1—completely settled, 2—settling nearly complete only a slight amount remaining dispersed, 3—moderate dispersion, 4—good dispersion with some settling noticeable, 5—excellent dispersion. The following table shows the dispersion remaining after various periods of time.

Table 1

| Solution | 1 Day | 1 Week | 1 Month | 3 Months |
| --- | --- | --- | --- | --- |
| Control | 1 | 1 | 1 | 1 |
| a | 4 | 2 | 1 | 1 |
| b | 5 | 3 | 2 | 2 |
| c | 5 | 4 | 4 | 4 |
| d | 5 | 5 | 5 | 5 |
| e | 5 | 5 | 5 | 5 |
| f | 5 | 5 | 5 | 5 |

It will be noted that although carbon in the control samples had settled completely after one day, the samples containing the diol acyl titanate were still dispersed even at the lowest concentration.

EXAMPLE 15

A series of six solutions of kerosene solutions containing 2,5-dimethylhexanediol-2,5 stearoyl dibutyl titanate were prepared as in Example 13. Instead of adding the carbon black, however, approximately 0.2 g. of a sludge obtained from an oil filter was used. The results are shown in the following table, the numbers and solutions having the same significance as in Example 13.

Table 2

| Solution | 1 Day | 1 Week | 1 Month | 3 Months |
| --- | --- | --- | --- | --- |
| Control | 4 | 2 | 1 | 1 |
| a | 4 | 2 | 1 | 1 |
| b | 5 | 4 | 3 | 3 |
| c | 5 | 5 | 3 | 3 |
| d | 5 | 5 | 4 | 4 |
| e | 5 | 5 | 4 | 4 |
| f | 5 | 4 | 3 | 3 |

EXAMPLE 16

The procedure of Example 14 was repeated using 0.1 g. of powdered activated charcoal in place of the oil filter sludge. The results were substantially the same as in Example 14.

EXAMPLE 17

The procedure of Example 14 was repeated except that #2 fuel oil was used in place of the kerosene. The results were as follows:

Table 3

| Solution | 1 Day | 1 Week | 1 Month | 3 Months |
| --- | --- | --- | --- | --- |
| Control | 5 | 3 | 1 | 1 |
| a | 5 | 3 | 2 | 1 |
| b | 5 | 4 | 2 | 2 |
| c | 5 | 3 | 2 | 2 |
| d | 5 | 4 | 4 | 3 |
| e | 5 | 5 | 5 | 5 |
| f | 5 | 5 | 4 | 4 |

EXAMPLE 18

The procedure of Example 17 was repeated except that 2-ethylhexanediol-1,3 stearoyl dibutyl titanate, prepared by reacting one mole of tetrabutyl titanate with a mole of stearic acid and reacting the product with one mole of 2-ethylhexanediol-1,3 was used in place of the 2,5-dimethylhexanediol-2,5 stearoyl dibutyl titanate. The results were substantially the same.

EXAMPLE 19

The procedure of Example 18 was repeated using light diesel fuel oil. The results were substantially the same except that in this case the carbon black settled much more rapidly in the control sample containing no titanates so that it was clear in less than 12 hours.

EXAMPLE 20

Di-2-ethyl-2-butylpropanediol-1,3 stearoyl isopropyl titanate was prepared by reacting one mole of stearic acid with one mole of tetraisopropyl titanate, and then reacting the product with two moles of 2-ethyl-2-butylpropanediol-1,3. One gram of this material was dissolved in a liter of kerosene. When carbon black was added to this solution and shaken, it remained dispersed, although when added to the kerosene alone, the carbon black was nearly completely settled within 6 hours. Solutions containing 0.1 g. and 0.05 g. per liter of kerosene were also prepared and found to give good dispersion of carbon black.

EXAMPLE 21

The procedure of Example 20 was repeated except that a sludge from an oil filter was used in place of the carbon black. After a week settling was nearly complete in a control sample while the sludge in the samples containing the titanate remained well dispersed.

EXAMPLE 22

The procedure of Example 20 was repeated using in place of the di-2-ethyl-2-butylpropanediol-1,3 stearoyl isopropyl titanate, the compounds listed in Table 4.

Table 4

| Compound | Dispersion Rating, 1 gpl. solution |
| --- | --- |
| 2-methylpentanediol-2,4 stearoyl dibutyl titanate | 4 |
| di-2-methylpentanediol-2,4 stearoyl butyl titanate | 3 |
| tri-2-methylpentanediol-2,4 stearoyl titanate | 4 |
| di-2-methylpentanediol-2,4 distearoyl titanate | 2 |
| 2-methylpentanediol-2,4 distearoyl butyl titanate | 3 |
| di-n-Octylene glycol stearoyl butyl titanate | 5 |
| di-2-methylpentanediol-2,4 stearoyl 2-ethylhexyl titanate | 3 |
| di-2,5-dimethylhexanediol-2,5 stearoyl butyl titanate | 4 |
| di-Butanediol-2,3 stearoyl butyl titanate | 2 |
| di-Butanediol-14 stearoyl butyl titanate | 4 |
| di-2,2,4-trimethylpentanediol-1,3 stearoyl butyl titanate | 3 |
| Pentanediol-2,4 stearoyl diisopropyl titanate | 2 |
| 3,6-dimethyl-4-octynediol-3,6 stearoyl dibutyl titanate | 3 |
| di-Butene-2-diol-1,4 stearoyl butyl titanate | 4 |
| di-2-ethylhexanediol-1,3 myristoyl butyl titanate | 4 |
| di-2-methylpentanediol-2,4 lauroyl butyl titanate | 4 |
| di-2-methylpentanediol-2,4 oleoyl butyl titanate | 3 |
| di-2-methylpentanediol-2,4 linoleoyl butyl titanate | 3 |
| di-2-methylpentanediol-2,4 nonanoyl butyl titanate | 4 |
| 2-ethylhexanediol-1,3 acetyl dibutyl titanate | 3 |

The effectiveness of these compounds in dispersing carbon black in kerosene solution is also shown in Table 4. The dispersion of the carbon black in the kerosene alone was very poor.

From the above description and by the examples presented it has clearly been demonstrated that semi-colloidal and free carbon may be maintained in a dispersed state in liquid hydrocarbon fuel by the addition of diol acyl titanates. The carbonaceous material remains in suspension without sludge formation. The diol acyl titanate used for dispersion does not react with the moisture to form insoluble polymers.

This application is a continuation-in-part of my application Serial No. 529080, filed August 17, 1955, now abandoned.

While this invention has been described and illustrated by the examples shown, it is not intended to be strictly limited thereto, and other modifications and variations may be employed within the scope of the following claims.

I claim:
1. An organo-titanium compound having the empirical formula

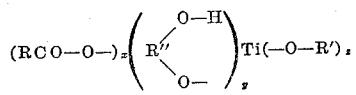

where RCO— is an acyl group in which R is an unsubstituted alkyl group containing from 2 to 20 carbon atoms, where R' is an unsubstituted lower alkyl group and where R'' is a diol residue containing at least 3 carbon atoms and selected from the group consisting of $\alpha$-, $\beta$-, $\gamma$-, and $\delta$-, said diol residue having no other functional groups, the $x$ in said formula is 1 to 3, $y$ is 1 to 3 and $z$ is $4-(x+y)$, the sum of $x+y+z$ equals 4, the titanium in said compound is quadrivalent and covalently bonded to 4 of said organic groups through oxygen atoms.

2. Compound according to claim 1 in which $x=1$, $y=1$ and $z=2$.

3. Compound according to claim 1 in which $x=1$, $y=2$ and $z=1$.

4. Compound according to claim 1 in which $x=2$, $y=2$ and $z=0$.

5. Compound according to claim 1 in which $x=3$, $y=1$ and $z=0$.

6. Compound according to claim 1 in which the diol acyl titanate is di-(2-methylpentanediol-2,4) butyl stearoyl titanate.

7. Compound according to claim 1 in which the diol acyl titanate is tri-(2-methylpentanediol-2,4) stearoyl titanate.

8. Compound according to claim 1 in which the diol acyl titanate is di-(2,5-dimethylhexanediol-2,5) stearoyl titanate.

9. Compound according to claim 1 in which the diol acyl titanate is di-(2,5-dimethyl-3-hexynediol-2,5) stearoyl titanate.

10. A method for the preparation of an organic titanium compound which comprises reacting an unsubstituted lower alkyl acyl titanate with a diol, the acyl group in said alkyl acyl titanate having the formula RCO— in which R is an unsubstituted alkyl group containing from 2 to 20 carbon atoms, said diol being selected from the group consisting of $\alpha$-, $\beta$-, $\gamma$-, and $\delta$-diols and having no other functional groups, said compound containing from 1 to 3 diol residues and from 1 to 3 acyl groups, the sum of said diol residues and said acyl groups being from 2 to 4.

References Cited in the file of this patent
UNITED STATES PATENTS

| | | |
|---|---|---|
| 2,397,859 | Hershberger et al. | Apr. 2, 1946 |
| 2,489,651 | Langkammerer | Nov. 29, 1949 |
| 2,614,112 | Boyd | Oct. 14, 1952 |
| 2,621,193 | Langkammerer | Dec. 9, 1952 |
| 2,642,344 | Livingston | June 16, 1953 |
| 2,642,345 | Bradley et al. | June 16, 1953 |
| 2,643,262 | Bostwick | June 23, 1953 |
| 2,736,666 | Beacham | Feb. 28, 1956 |
| 2,795,553 | Lowe | June 11, 1957 |
| 2,845,445 | Russel | July 29, 1958 |

FOREIGN PATENTS

| | | |
|---|---|---|
| 733,224 | Great Britain | July 6, 1955 |